Patented Aug. 12, 1924.

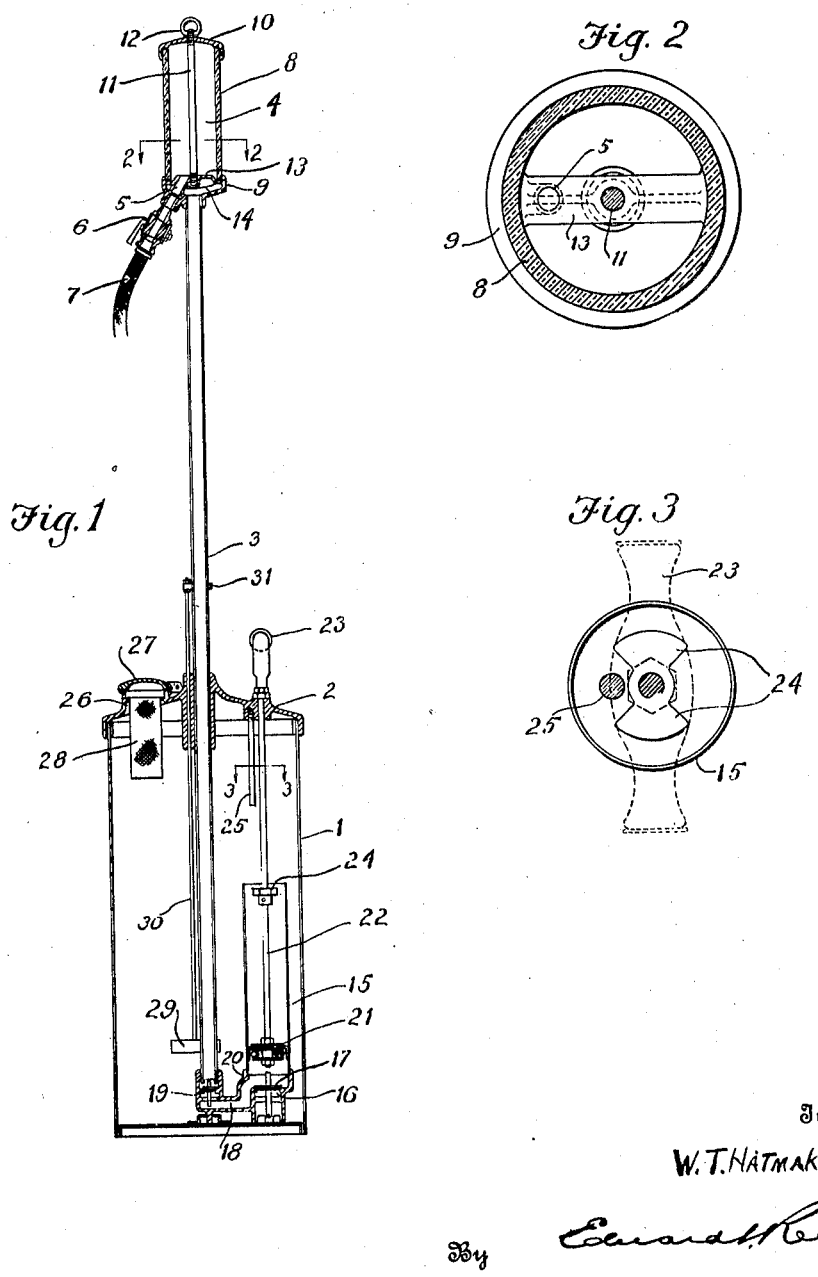

1,505,022

UNITED STATES PATENT OFFICE.

WILLIAM T. HATMAKER, OF DAYTON, OHIO, ASSIGNOR TO THE NATIONAL RECORDING PUMP COMPANY, OF DAYTON, OHIO, A CORPORATION OF OHIO.

DISPENSING APPARATUS FOR LUBRICATING OILS AND THE LIKE.

Application filed March 1, 1920. Serial No. 362,186.

*To all whom it may concern:*

Be it known that I, WILLIAM T. HATMAKER, a citizen of the United States, residing at Dayton, in the county of Montgomery and State of Ohio, have invented certain new and useful Improvements in Dispensing Apparatus for Lubricating Oils and the like, of which the following is a specification, reference being had therein to the accompanying drawing.

This invention relates to a dispensing apparatus for lubricating oils and the like.

The apparatus is designed more particularly for deliverying lubricating oil to the crank case of an automobile engine. It is customary to deliver lubricating oil to the crank case from a measuring cup through a funnel. The filling opening of the crank case is usually more or less difficult of access and as the oil runs slowly the filling operation is a tedious one, and moreover it frequently results in a loss of oil due to spilling.

The object of the invention is to provide a dispensing apparatus which can be connected with the crank case and a measured quantity of oil delivered to a delivery receptacle from which it will drain into the crank case without further attention on the part of the operator, thus permitting him to attend to other business, such as the delivery of a quantity of gasoline to the same automobile.

A further object of the invention is to provide such an apparatus which will be simple in its construction and operation, and which will be portable.

A further object of the invention is to provide such an apparatus with means for delivering different measured quantities of liquid to the delivery receptacle.

A further object of the invention is to provide a dispensing apparatus with a receptacle to receive liquid from a measuring pump, having an outlet in the lower end thereof, and provided with a transparent wall through which the liquid entering the same may be inspected.

Other objects of the invention will appear as the device is described in detail.

In the accompanying drawings Fig. 1 is a vertical section taken centrally through an apparatus embodying my invention; Fig. 2 is an enlarged section taken on the line 2—2 of Fig. 1; and Fig. 3 is an enlarged section taken on the line 3—3 of Fig. 1.

In these drawings I have illustrated one embodiment of my invention and have shown the same as embodied in a portable apparatus designed primarily for delivering lubricating oil to the crank case of an automobile engine. It will be understood, however, that the invention may take various forms and may be utilized, either in part or as a whole, with apparatus of various kinds.

In the particular embodiment of the invention here illustrated I have provided a main receptacle, or tank, 1 which is adapted to contain a quantity of lubricating oil, or other liquid which is to be dispensed, and the upper end of which is closed by a head, or top plate, 2. Extending through the top plate and projecting some distance above the same is a discharge conduit, or pipe, 3, to the upper end of which is connected a delivery receptacle 4 adapted to receive liquid from the main receptacle and provided near its lower end with a discharge conduit, or outlet, 5 by means of which the liquid may be delivered from the delivery receptacle to the crank case, or other receptacle provided by the customer. As here shown, the outlet 5 is controlled by a valve 6 and is connected with a flexible hose 7, by means of which the apparatus may be readily connected with the crank case. The delivery receptacle may take various forms but I prefer that it be provided with a transparent wall through which the liquid entering the same may be inspected, both as to character and as to quantity. In the construction here shown, the receptacle comprises a cylindrical glass body portion 8 which is supported at its lower end on a base 9 mounted on and communicating with the discharge pipe or conduit 3, the base being preferably screw threaded onto the upper end of the pipe. The upper end of the receptacle is closed by a cap 10 which rests upon the upper end of the cylindrical glass body portion 8 and is provided with an opening to receive a rod 11 which is rigidly secured to the base 9 and the upper end of which is screw threaded to receive a nut 12 by means of which the cap 10 may be clamped on to the body portion 8 and the several parts of the receptacle rigidly connected one to the other. As here illustrated, the base 9 is provided at a point above its bottom with a transverse member 13 into which the lower end of the rod 11 is screw threaded. The partition is of such a character as to provide openings to connect the body portion of the receptacle with the conduit 3 and, as here shown, it is in the form of a relatively narrow plate connected at its ends with the side walls of the base 9, thus leaving relatively large openings on both sides thereof and forming beneath the same a chamber 14. The outlet pipe 5 extends through the partition 13 and communicates with the receptacle above the same so that when the measured quantity of liquid has been delivered from the receptacle 4, the base chamber 14 will remain full. This construction also permits any sediment or foreign matter which the liquid may contain to settle into the base chamber so that it will not be drawn off through the outlet pipe.

A measuring device, here shown as a measuring pump, communicates with the interior of the main receptacle 1 and with the discharge conduit 3 and serves to deliver measured quantities of liquid from the main receptacle to the delivery receptacle. Preferably this pump is mounted within the main receptacle and in the construction here illustrated it comprises a cylinder 15 communicating with the interior of the main receptacle through a port 16 which is controlled by an inwardly opening valve 17. The cylinder also communicates with the discharge pipe 3 through a passage 18 which is controlled by an outwardly opening valve 19. The port 16 and passage 18 are preferably formed in a casing 20 which forms the base, or lower head, for the cylinder 15. Mounted within the cylinder is a piston 21 with which is connected a rod 22 extending upwardly through the top plate 2 and provided with a handle 23 by means of which the piston may be manipulated.

The cylinder is of such a size that when the piston is drawn to the upper limit of its movement a predetermined quantity of liquid will be drawn into the cylinder, in the present instance one quart, and upon the downward movement of the piston this liquid will be discharged from the conduit 3 into delivery receptacle. If the discharge conduit 3 and the base chamber 14 are full of liquid, which can be determined by an inspection through the transparent wall of the receptacle, a full quantity of liquid will be thus delivered to the delivery receptacle. If the inspection shows that the base chamber 14 is not full of liquid the piston may be depressed far enough to fill the base chamber and then again elevated to the limit of its movement to again completely fill the cylinder, after which its depression will discharge a full quantity of liquid into the delivery receptacle. I also prefer to provide means for so controlling the movement of the piston that a measured quantity of liquid, less than the full capacity of the cylinder, may be delivered to the delivery receptacle, and this I accomplish by providing the piston rod with a stop which will cooperate with a fixed stop carried by the main casing to limit the upward movement of the piston and to thus limit the amount of liquid drawn into the same. In the present device the piston rod 22 has secured thereto a stop comprising two oppositely extending lugs, or wings, 24, which may be positioned by rotating the rod 22 to cause one of them to lie in the path of a stop rod 25 secured to and depending from the top plate 2 of the main receptacle, the length of this stop rod being such that it will interrupt the movement of the piston when it has drawn into the cylinder the desired amount of liquid, in the present instance, one pint. The lugs 24 of the piston rod stop are so positioned with relation to the handle 23 that when this handle is positioned radially of the discharge conduit both lugs will be out of line with the stop rod 25, but when the handle extends transversely to the radius of the discharge conduit, in either direction, one of the lugs will lie in the path of the stop, thus the position of the handle indicates the amount of liquid which will be drawn into the cylinder by the manipulation thereof.

The main receptacle may be filled through an opening 26 which is normally closed by a hinged cap 27 and, if desired, a screen 28 may be inserted in the opening 26 to remove from the liquid as it enters the main receptacle any impurities or foreign matter which it may contain. I have also provided the apparatus with a gage to indicate the amount of liquid contained thereby and, as here shown, this gage comprises a float 29 with which is connected a rod 30 slidably mounted in the top plate 2 of the main receptacle and having at its upper end an indicator, which is here shown as a ring, 31, extending about the conduit 3 and the position of which will indicate the quantity of liquid contained by the main receptacle.

The operation of the apparatus will be readily understood from the foregoing description thereof and it will be apparent that I have provided a very simple dispensing apparatus which can be readily moved from one position to another and with which a measured quantity of oil can be quickly delivered to the delivery receptacle and then allowed to drain slowly therefrom into the crank case of an automobile, without attention on the part of the operator, and that the construction of the delivery receptacle is such as to enable it to be readily determined whether or not a full measure of liquid is delivered thereto, it being understood, of course, that the valve 6 will be closed until the full quantity of liquid has been delivered to the delivery receptacle. It will further be apparent that this device enables the lubricating oil to be delivered to an automobile simultaneously with the delivery of gasoline thereto, where this may be desired, and further that it prevents loss of oil due to spilling, which frequently occurs when the oil is delivered to the crank case from a measuring cup through a funnel; and further that it reduces to a minimum the possibility of dirt or other foreign matter entering the crank case along with the oil.

While I have shown and described one embodiment of my invention I wish it to be understood that I do not desire to be limited to the details thereof as various modifications may occur to a person skilled in the art.

Having now fully described my invention what I claim as new and desire to secure by Letters Patent is:

1. A liquid dispensing apparatus, comprising a portable main receptacle, a discharge conduit carried by and extending above said main receptacle, a delivery receptacle supported by and communicating with said discharge conduit at a point above said main receptacle and having an outlet near the bottom thereof, a pump cylinder mounted within said main receptacle and communicating with said discharge pipe, a piston mounted in said cylinder, a rod connected with said piston and extending beyond the end of said receptacle, a stop extending from the wall of said main receptacle, and a lug carried by said piston rod adapted to be moved into and out of alinement with said stop rod by the rotation of said piston rod.

2. A liquid dispensing apparatus, comprising a portable main receptacle, a discharge conduit carried by and extending above said main receptacle, a delivery receptacle supported by and communicating with said discharge conduit at a point above said main receptacle and having an outlet near the bottom thereof, a pump cylinder mounted within said main receptacle and communicating with said discharge pipe, a piston mounted in said cylinder, a rod connected with said piston and extending beyond the end of said main receptacle, a stop rod depending from the top of said main receptacle, lugs secured to and extending from the opposite sides of said piston rod, and a handle secured to said piston rod and so arranged with relation to said lugs that when said handle is in one position one of said lugs will be in alinement with said stop rod and when said handle is in another position neither of said lugs will be in alinement with said stop rod.

In testimony whereof, I affix my signature hereto.

WILLIAM T. HATMAKER.